United States Patent
Sofman et al.

[11] Patent Number: 6,151,327
[45] Date of Patent: Nov. 21, 2000

[54] METHOD OF ROUTING AND BUNDLING DEMANDS WITH LOW UTILIZATION IN A TELECOMMUNICATIONS NETWORK

[75] Inventors: Lev B. Sofman; Sridhar S. Nathan, both of Plano, Tex.

[73] Assignee: MCI Communications Corporation, Washington, D.C.

[21] Appl. No.: 08/885,767

[22] Filed: Jun. 30, 1997

[51] Int. Cl.[7] ................................................. H04M 7/00
[52] U.S. Cl. ........................ 370/437; 370/477; 379/219
[58] Field of Search .................... 370/228, 254, 370/255, 256, 351, 437, 477; 714/4; 379/10, 219

[56] References Cited

U.S. PATENT DOCUMENTS

| | | | |
|---|---|---|---|
| 5,497,368 | 3/1996 | Reijnierse et al. | 370/54 |
| 5,521,910 | 5/1996 | Matthews | 370/256 |
| 5,729,528 | 3/1998 | Salingre et al. | 370/230 |
| 5,734,640 | 3/1998 | Johnson | 370/228 |
| 5,754,543 | 5/1998 | Seid | 370/351 |
| 5,787,271 | 7/1998 | Box et al. | 714/4 |
| 5,790,633 | 8/1998 | Kinser, Jr. et al. | 379/10 |
| 5,793,765 | 8/1998 | Boer et al. | 370/395 |

OTHER PUBLICATIONS

Wang and Hung "Contention Resolution in the Loop–Augmented Shuffle Net Multihop Lightware Network" IEEE, pp. 186–190, Jan. 1994.

Chlamtac "Bounded Delay Routing for Real Time Communication in Tactical Radio Networks" IEEE pp. 1–5, Jan. 1989.

Gross and Ziemer "Distributed Routing Algorithm Performance in Hostile Environments" IEEE pp. 225–229, Jan. 1989.

Cormen, Thomas H.; Leiseron, Charles E.; Rivest, Ronald L.; Introduction to Algorithms, The MIT Press, McGraw–Hill Book Company, 1990, p. 496.

Reingold, Edward M.; Nievergelt, Jurg; Deo, Narsingh; Combinatorial Algorithms: Theory and Practice, Prentice–Hall, Inc. 1977, pp. 330, 348–352.

*Primary Examiner*—Ajit Patel
*Assistant Examiner*—John Pezzlo

[57] ABSTRACT

A method of optimizing a network includes a plurality of nodes interconnected by high multiplex level links, in which at least some of the links carry a number of low multiplex level remaining demands that is less than the capacity of the links, by rerouting lower multiplex level remaining demands through the network to reduce the total number of higher multiplex level links in the network. The method eliminates from consideration any bridges and spurs in the network, thereby forming one or more connected components of the network. After the spurs and bridges have been eliminated from consideration, the method reroutes remaining low multiplex level demands through each of the remaining connected components of the network to reduce the total number of high multiplex level links in each remaining portion. Computationally, the rerouting step of the present invention includes the step of solving an integer multicommodity flow problem by minimizing the cost of links of each of the connected components, subject to a symmetry constraint, an initial solution constraint, a conservation constraint, and a modularity constraint.

9 Claims, 5 Drawing Sheets

METHOD OF ROUTING AND BUNDLING DEMANDS WITH LOW UTILIZATION IN A TELECOMMUNICATIONS NETWORK

The present Application is related to application Ser. No. 08/862,290, filed May 23, 1997, titled Method of Telecommunications Demand-Route Multiplexing (DEROM), and application Ser. No. 08/863,050, filed May 23, 1997, titled Method of Routing and Multiplexing Demands in a Telecommunications Network, each of which is assigned to the Assignee of the present Application, and the disclosures of which is incorporated by reference herein for all purposes.

FIELD OF THE INVENTION

The present invention relates generally to communication network design and more particularly to a method of routing and bundling lower multiplex level demands in a telecommunications network to reduce or eliminate under-utilized higher multiplex level links.

DESCRIPTION OF THE PRIOR ART

Modern digital telecommunications systems are built upon a hierarchical network. The network consists of a plurality of nodes or sites that are interconnected by transmission facilities. Generally, lower bandwidth level demands are multiplexed into higher bandwidth demands. For example, up to twenty-eight 1.544 Mbps DS1 channels can be multiplexed into a single 44.736 Mbps DS3 channel. Similarly, up to twelve DS3 channels can be multiplexed into a single 622.08 Mbps OC12 channel. Finally, up to sixteen OC12 channels can be multiplexed into a single 9.953 Gbps OC192 channel.

A goal of telecommunications network design is to serve the demand at the least cost, while maintaining an acceptable level of survivability in the event of equipment or facility failures. One element of cost in a network is transmission costs, which is generally based on the transmission distance. Generally, transmission costs can be minimized by routing the demand in the shortest route between the origin and the destination of the demand, and multiplexing or bundling as much demand as possible into as few transmission channels as possible.

One method of routing and multiplexing demands so as to minimize transmission cost is disclosed in copending application Ser. No. 08/863,050, (Attorney Docket No. RIC-96-122 (20350.00020)), filed May 23, 1997, titled Method of Routing and Multiplexing Demands in a Telecommunications Network, in which lower multiplex level demands in a telecommunications network including a plurality of interconnected nodes are routed to form higher multiplex level demand-routes. The method first constructs, depending on a predetermined diversity policy, either a single initial lower multiplex level demand-route, or a primary initial lower multiplex level demand-route and a diversely routed secondary initial lower multiplex level demand-route, for each pair of nodes of the network. A lower multiplex level demand-route carries, on a specified route, lower multiplex level demands originating or terminating at a node of the pair. The single initial lower multiplex level demand-route or, in the case of diversity, the primary initial lower multiplex level demand-route is routed in the shortest route through the network.

The method splits the demand of each initial lower multiplex level demand-route between an express demand and an overflow demand. The method makes the split according to an express parameter and a patching threshold value. The express parameter is an integer multiple of ratio between the higher multiplex level and the lower multiplex level. The patching threshold value is chosen by the network designer to optimize the network in terms of total cost. The method splits the demand of the initial lower multiplex level demand-routes by dividing the demand by the express parameter to obtain an integer multiple of the express parameter and a remainder. Whenever the remainder is equal to or greater than the threshold value, the method routes the entire demand in a higher multiplex level express demand-route. Whenever the remainder is less that the threshold value, the method routes the remainder through a patching route. and routes express demands in higher multiplex level express routes. The method patches the overflow demands into higher multiplex level routes according to a predetermined patching policy.

Thus, the method of application Ser. No. 08/862,290 produces a set of first higher multiplex level demand-routes made up of express routes and patched routes. The first higher multiplex level demand-routes may be multiplexed to a second or higher multiplex level, either by repeating the process of application Ser. No. 08/862,290, or by the method of co-pending application Ser. No. 08/862,290, (Attorney Docket No. RIC-96-052 (20350.00015)), filed May 23, 1997, titled Method of Telecommunications Capacity Multiplexing. For example, an initial set of DS3 demands may be routed to form a set of OC-12 demand routes by the method of application Ser. No. 08/862,290. The resulting set of OC-12 demand-routes may then be bundled according to application Ser. No. 08/862,290 to form a set of OC-192 demand-routes.

Invariably, at the conclusion forming a set of high multiplex level demand-routes, there will be high multiplex level links between nodes of the network that have a low fill ratio and carry a relatively low number of lower multiplex level demands. For example, an OC-192 link between a pair of nodes may carry only eight OC-12 demands. Such a link is using only half of its capacity, and the demands on that link are referred to as remaining demands.

Since an origination typically has demands for multiple destinations, or because of diversity, there may be multiple paths through the network between an origination and a destination, although there is only one shortest path for each origination-destination pair. Since each path through the network typically includes links with remaining demands, there may be more links than are necessary to carry the demand between the origination and the destination. Thus, shortest path routing does not necessarily ensure that the lowest cost network will be achieved. Accordingly, it is an object of the present invention to provide a method of optimizing a telecommunications network by reducing or eliminating the number of links carrying remaining demands.

SUMMARY OF THE INVENTION

Briefly stated, the present invention provides a method of optimizing a network includes a plurality of nodes interconnected by high multiplex level links, in which at least some of the links carry a number of low multiplex level remaining demands that is less than the capacity of the links, by rerouting lower multiplex level remaining demands through the network to reduce the total number of higher multiplex level links in the network.

The method performs network graph reduction by partitioning the network into connected component subnetworks, without any bridges and spurs. A spur is a link that extends linearly away from a portion of a network to single node. A bridge is a link or set of links that provide a single pathway between a pair of connected portions of a network. Bridges and spurs provide the only link between certain nodes in the network. Accordingly, demands between these nodes cannot be rerouted to reduce the total number of high multiplex level links in the network.

After the spurs and bridges have been eliminated from consideration, the method of the present invention reroutes remaining low multiplex level demands through each of the connected components of the remaining network to reduce the total number of high multiplex level links in each of the components. Computationally, the rerouting step of the present invention includes the step of solving an integer multicommodity flow problem by minimizing the cost of links of each of the components, subject to a symmetry constraint, a conservation constraint, and a modularity constraint.

The method includes a step of determining whether or not a connected component is small enough to solve the integer multicommodity flow problem directly. If not, the method divides the connected component into a plurality of nested sub-networks. The method then minimizes the cost of smallest of the nested sub-networks, subject to a symmetry constraint, a conservation constraint, and a modularity constraint.

After the method as found a minimum cost solution for the smallest sub-network, the method then minimizes the cost of the next smallest nested sub-network, which includes the smallest subnetwork, again subject to a symmetry constraint, a conservation constraint, and a modularity constraint. Additionally, the method minimizes the cost of the next smallest sub-network subject to an initial solution constraint. The initial solution constraint is based on the minimized cost of the preceding smallest nested sub-network. More particularly, the initial solution constraint is based on an offset, which is equal to the difference between the initial cost of the smallest nested sub-network and the minimized cost of the smallest nested sub-network. The method continues to minimize the cost of each succeedingly larger nested sub-network, subject to the symmetry, conservation, modularity, and initial solution constraints, until the cost of the entire connected component been minimized.

DESCRIPTION OF THE PREFERRED EMBODIMENT

Figure 1A:
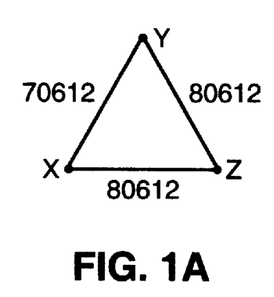
FIGS. 1A and 1B are simple network diagrams illustrating the basic concept of the present invention.
Figure 1B:
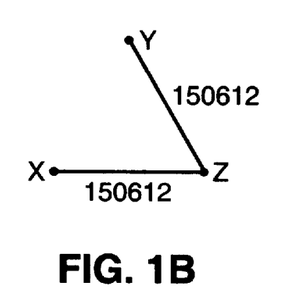

Referring now to the drawings, and first to FIGS. 1A and 1B, a simple network, comprising nodes X, Y, and Z, is illustrated. In FIG. 1A, nodes X, Y, and Z are interconnected by three OC192 links, each of the shortest distance between its associated nodes. In the example of FIGS. 1A and 1B, there are seven OC12 demands between nodes X and Y, eight OC12 demands between nodes Y and Z, and eight OC12 demands between nodes Z and X. Since an OC192 channel can carry as many as sixteen OC12 demand units, each of the three links in FIG. 1A is under utilized.

Referring to FIG. 1B, it may be seen that the seven OC12 demand units between nodes X and Y may be carried between nodes X and Y over the links connecting nodes X and Z and nodes Z and X, thereby eliminating the need for a direct, shortest route, link between nodes X and Y. Although the route through node Z is not the shortest route between nodes X and Y, the cost of the two link network of FIG. 1B is less than the cost of the three link network of FIG. 1A. Thus, it will be recognized that in cases where links are not fully utilized, shortest distance routing may not result in the minimum cost for a network.

Figure 2:
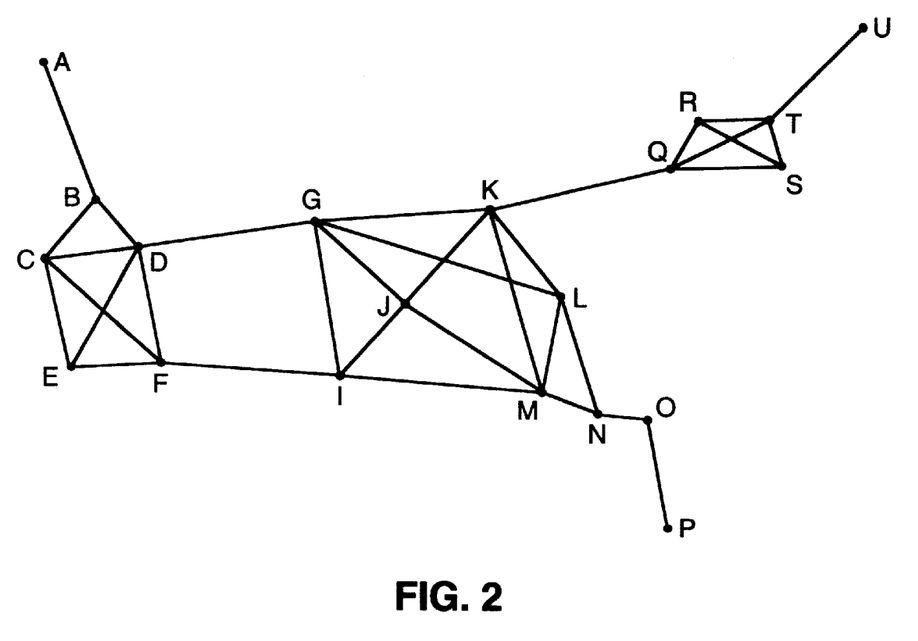
FIG. 2 is a diagram illustrating spurs, bridges, and remaining portions of a network.

Referring now to FIG. 2, there is illustrated a relatively complex network that includes 21 nodes and 33 links. In the example of FIG. 2, each link comprises a single OC192 link that carries a remaining demand that is less than 16 OC12 channels. The network of FIG. 2 may include other OC192 links that have been filled according to application Ser. No. 08/862,290, (Docket No. RIC-96-052 (20350.00015)) filed May 23, 1997, and application Ser. No. 08/863,050, (Attorney Docket No. RIC-96-122 (20350.00020)), filed May 23, 1997; however, the present invention is concerned only with links that carry remaining demands.

The present invention provides a method of rerouting remaining demands through the network so as to eliminate, if possible, links, as shown in connection with FIGS. 1A and 1B. Thus, the goal of the method of the present invention is to minimize total cost of the networks in terms of OC192 units, which is a particular case of the integer multicommodity flow problem.

Those skilled in the art will recognize that solving an integer multicommodity flow problem for a network the size of the one depicted in FIG. 2 is a very large problem. Accordingly, the present invention provides a heuristic approach to solving the problem. First, the method of the present invention reduces the size of the network by ignoring all links that are spurs. For example, in FIG. 2, link A-B is the only path to carry demand between nodes A and B. Thus, link AB is a spur and the demand carried by it cannot be rerouted. Similarly, links T-U and O-P are also spurs. Since transmission cost cannot be decreased by rerouting the demand on spur links, they are ignored by the method of the present invention.

Additionally, the method of the present invention ignores all bridges in the network. In FIG. 2, link K-Q provides the only link between a first subnetwork consisting of nodes B-N and a second subnetwork consisting of nodes Q-T. Accordingly, link K-Q is the only path carrying demands between the first subnetwork and the second subnetwork and those demands cannot be rerouted. Similarly, link N-O is a bridge between first subnetwork B-N and spur OP.

After eliminating all spurs and bridges, the remaining subnetworks are optimized according to the method of the present invention. In the example of FIG. 2, the method of the present invention optimizes subnetworks B-N and Q-T separately. Additionally, according to the present invention, a subnetwork that is too large to be optimized in a reasonable amount of computing time is partitioned into a plurality of nested subnetworks. Starting with the smallest nested subnetwork, an optimum solution is found. Then, the next smallest subnetwork is optimized using the cost savings obtained in optimizing the smallest subnetwork as a constraint. Each successively larger nested subnetwork is similarly optimized until the entire network has been optimized. For example, the subnetwork B-N of FIG. 2 may be partitioned into nested subnetworks B-F; B-I; B-K; B-L; and B-N. The cost of network B-F is minimized, subject to symmetry, conservation, and modularity constraints. Then, the cost of subnetwork B-I is minimized to subject to an initial solution constraint, based upon the solution to network B-F, and to the symmetry, conservation, and modularity constraints. In FIG. 2, subnetwork Q-T is small enough to be optimized as a whole without partitioning it into nested subnetworks.

The method of the present invention minimizes the cost of each subnetwork by solving an integer multicommodity problem for bundling (IMPB). The notation used in mathematically formulating the IMPB includes the following parameters:

the letters "i, j, k, and n" represent nodes of the network of interest;

the expression "(i, j)" represents a link or a commodity between nodes i and j;

"LINKS" represents the set of all links in the subnetwork of interest;

"COMMODITIES" is the set of all commodities in a network of interest;

the expression "cost(i,j)" is the cost of the link (i,j), which can be represented by the mileage of the link. We assume that cost is a symmetrical function, i.e. cost(i,j) is equal to cost(j,i) for every link (i,j); and, the term "OFFSET" is a numerical parameter that is based upon the cost savings obtained in optimizing a next smaller nested subnetwork.

The formulation of the integer multicommodity problem for bundling according to the present invention defines certain variables as follows:

The variable "Flow_H(i,j)" is the amount of high multiplex level flow (e.g., the number of OC192s) from node I to node j along link (i,j);

The variable "Flow_L(i,j,k,n)" represents the amount of low multiplex level flow (e.g., the number of OC12s) for the commodity (i,j) along the link (k,n);

The variable "Mod" is the modularity factor between the high and low multiplex level (e.g., in the case of OC192/OC12, Mod equals 16);

The variable "demand(i,j)" is an amount of low multiplex capacity demands between nodes I and j for commodity (i,j); and The variable "use(i,j,k,n)" is a binary variable that is equal to 1 if commodity (i,j) uses the link (k,n), and otherwise equal to 0.

The objective of the integer multicommodity problem for bundling (IMPB) is to minimize total cost of the network or subnetwork under consideration, subject to certain constraints. The objective function may be represented as follows:

$$\min \sum_{(i,j) \in LINKS} cost(i,j) * Flow\_H(i,j).$$

The constraints include a high multiplex level flow capacity symmetry constraint, in which the high multiplex level flow between nodes n and k is equal to the high multiplex level flow between nodes k and n. The symmetry constraint may thus be expressed as follows:

$$Flow\_H(n,k) = Flow\_H(k,n), \forall (n,k) \in LINKS$$

The objective function is further subject to an initial solution constraint, that is based upon the cost savings for the next smaller nested subnetwork. The initial solution constraint may be expressed mathematically as follows:

$$\sum_{(i,j) \in LINKS} (cost(i,j) * Flow\_H(i,j)) \leq$$

$$2 * \sum_{(i,j) \in COMMODITIES} (cost(i,j)) - (2 * offset)$$

where offset =

$$\sum_{(i,j) \in COMMODITIES} (cost(i,j)) - 1/2 * \sum_{(i,j) \in LINKS} (cost(i,j) * Flow\_H_0(i,j))$$

where $Flow\_H_0(i,j)$ is the IMPB solution for the next smaller nested subnetwork. The initial solution constraint is based upon the a priori determination that the cost savings in optimizing a nested subnetwork must be at least as great as the cost savings obtained for the next smaller nested subnetwork.

The solution of the objective function is further subject to a conservation constraint, in which the flow of demands through the network must balanced. The integer multicommodity problem for bundling according to the present invention has a one route version and a multiroute version. According to the present invention, the conservation constraint is version specific. In the one route version, the conservation constraint may be expressed as follows:

$$\sum_{(k,n) \in LINKS} demand(i,j) * use(i,j,k,n) -$$

$$\sum_{(n,k) \in LINKS} demand(i,j) * use(i,j,n,k) = \begin{cases} -demand(i,j), \text{ if } n = i; \\ demand(i,j), \text{ if } n = j; \\ 0, \text{ otherwise} \end{cases}$$

In the multiroute version, the conservation constraint may be expressed as follows:

$$\sum_{(k,n) \in LINKS} Flow\_L(i,j,k,n) - \sum_{(n,k) \in LINKS} Flow\_L(i,j,n,k) = \begin{cases} -demand(i,j), \text{ if } n = i; \\ demand(i,j), \text{ if } n = j; \\ 0, \text{ otherwise} \end{cases}$$

The solution of the objective function is finally subject to a modularity constraint, which is based upon the modularity factor between the high and low multiplex level demands. Again, the modularity constraint is version specific. In the one route version, the modularity constraint may be expressed as follows:

$$\sum_{(i,j) \in COMMODITIES} demand(i,j) * use(i,j,n,k) + use(i,j,k,n) \leq$$

$$Mod * Flow\_H(n,k).$$

In the multiroute version, the modularity constraint is expressed as follows:

$$\sum_{(i,j) \in COMMODITIES} (\text{Flow\_L}(i, j, k, n) + \text{Flow\_L}(i, j, n, k)) \leq$$

$$\text{Mod} * \text{Flow\_H}(n, k).$$

Figure 3:
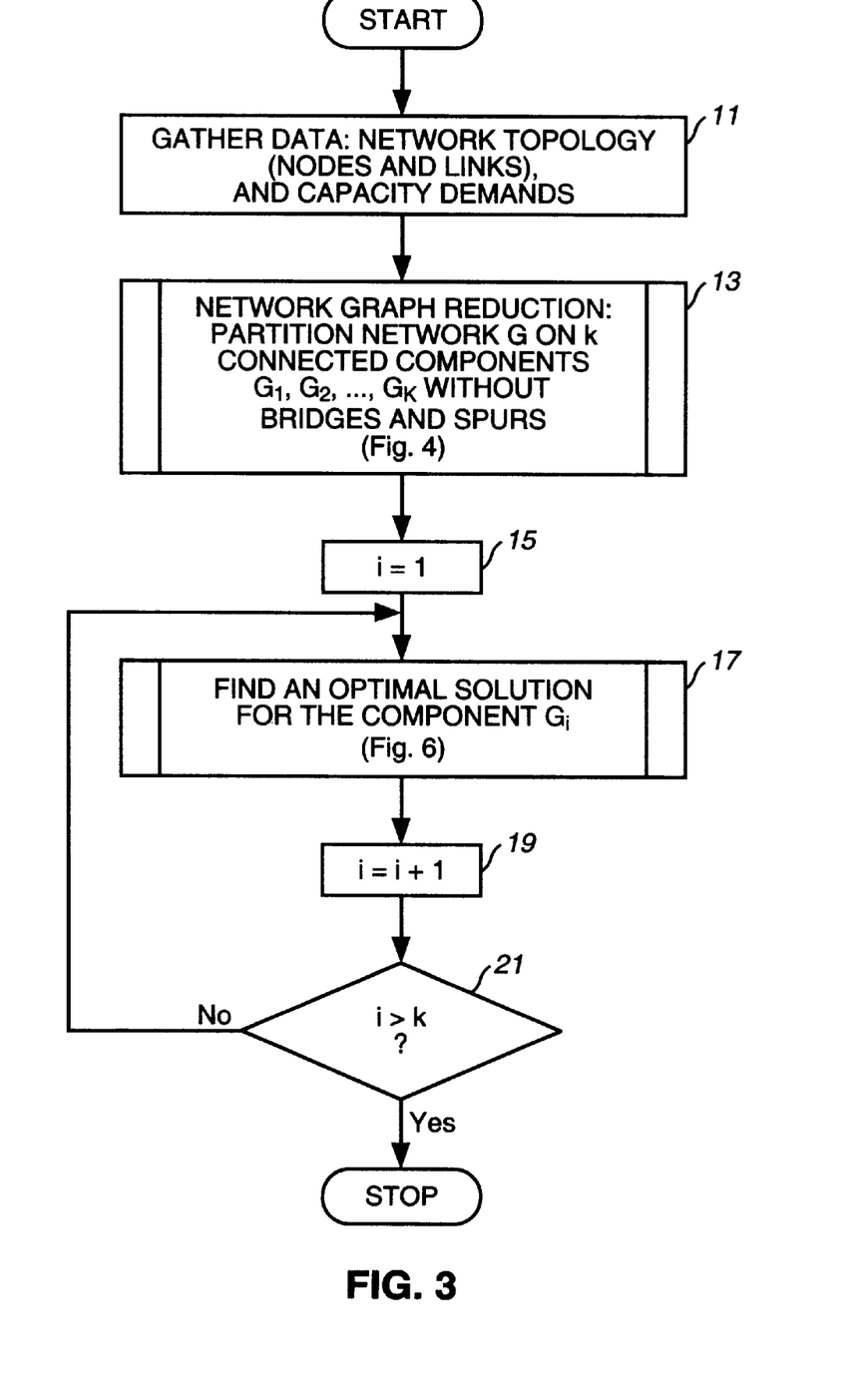
FIG. 3 is a flowchart of a preferred software implementation of the method of the present invention.

Referring now to FIG. 3, there is shown a flow chart of a preferred software implementation of the method of the present invention. The system gathers data at block 11. The data includes network topology, including information about the nodes and the links. The node data is a list of station identifiers. Every node in the list is unique. The link data is a list of links in the network. Each link can be identified by a pair of nodes that are connected by transmission media. Each record in the list has the format NODE ID1, NODE ID2, cost (i.e., mileage between the nodes). In the example of FIG. 2, a portion of the links data would appear as follows:

| | | |
|---|---|---|
| A | B | 125 |
| B | C | 52 |
| B | D | 47 |
| C | D | 49 |
| C | E | 119 |
| ... | ... | ... |

The order of nodes that identify the link is not important, but every link should be unique in the list.

The data also includes a list of demands expressed in integer units of low multiplex level capacity (e.g., number of OC12s) for each link. Each record in the list has the format NODE ID1, NODE ID2, and number of capacity units. An example of the demand list is as follows:

| | | |
|---|---|---|
| A | B | 8 |
| B | C | 4 |
| B | D | 3 |
| ... | ... | ... |

After the starting data has been gathered, the system performs network graph reduction, indicated generally at block 13. The processing of block 13 is shown in detail in FIG. 4 and it includes generally partitioning a network G on k connected components $G_1, G_2, \ldots G_k$ without bridges and spurs. Then, at block 15, the system sets I equal to 1 and finds an optimal solution for the component $G_i$, as shown in detail in FIG. 6, and represented generally at block 17. After the system has found an optimal solution for component $G_i$, the system sets I equal to I+1 at block 19 and tests, at decision block 21 whether or not I>k. If not, processing continues at block 17. Thus, the system finds an optimal solution for each component $G_i$ until I>k, at which point processing stops.

Figure 4:
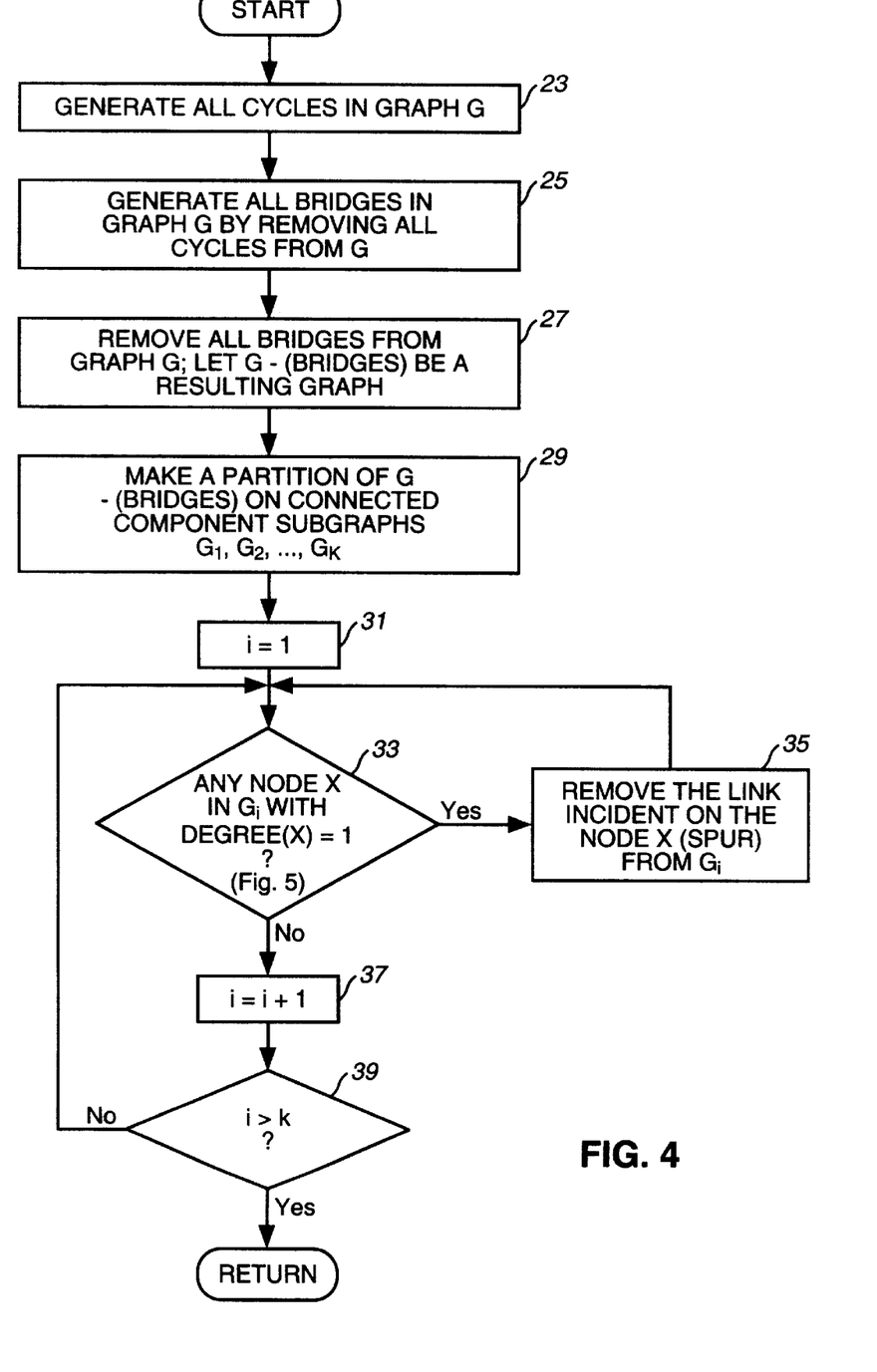
FIG. 4 is a flowchart of the network graph reduction routing of FIG. 3.
Figure 5:
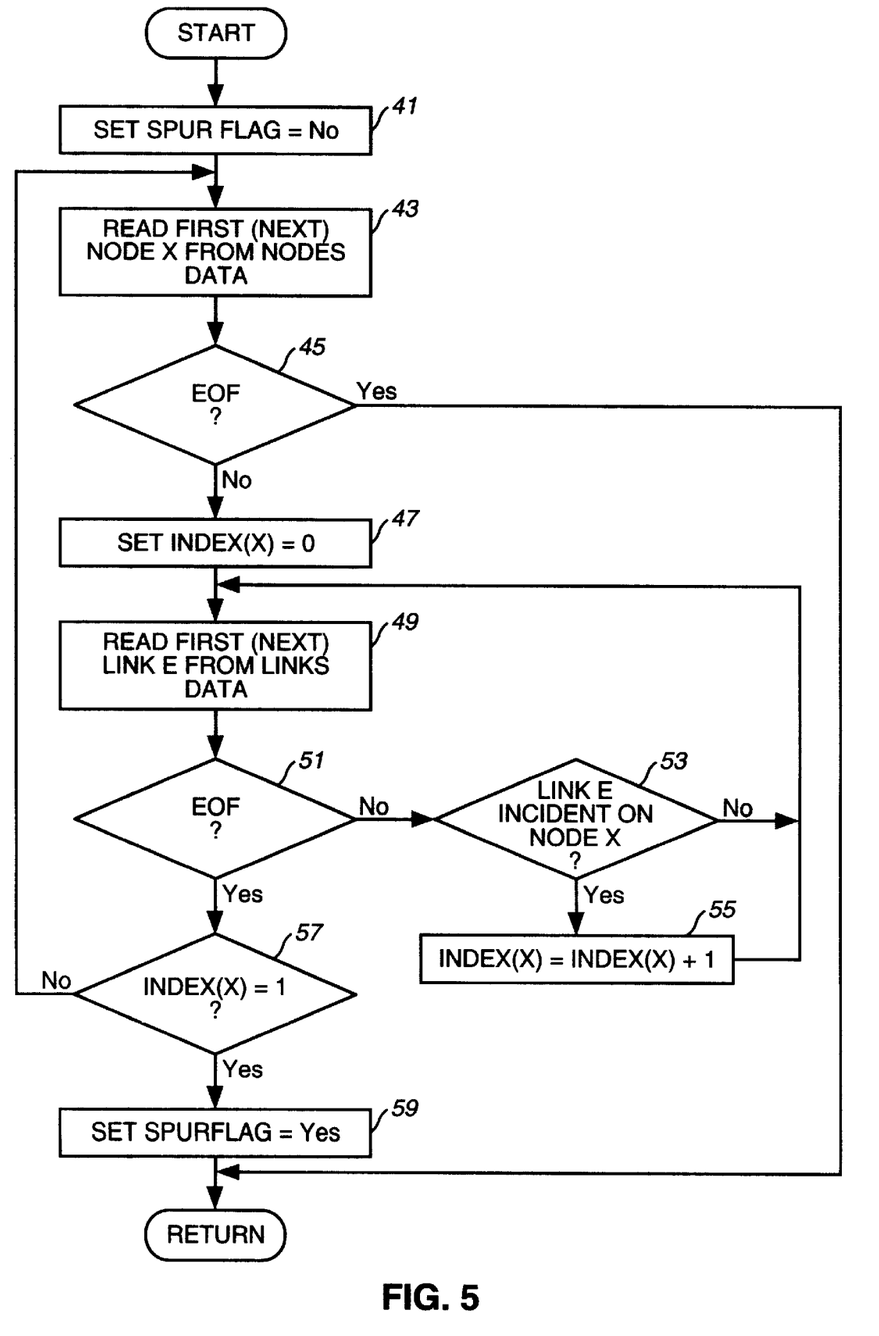
FIG. 5 is a flowchart of the test whether any node x in a subgraph is of degree one.

Network graph reduction according to the method of the present invention is illustrated with respect to FIGS. 4 and 5. A network can be represented as an undirected graph G=(V, E) that consists of a finite set of nodes V={$v_1, v_2, \ldots$} and a finite set of links E={$e_1, e_2, \ldots$}. To each link e there corresponds a pair of nodes X and Y. Link e=(x,y) is said to be incident on nodes X and Y, or link e joins nodes X and Y and nodes X and Y are said to be adjacent. Two links are said to be adjacent if they share a common node. A path is a sequence of adjacent links $(v_1, v_2), (v_2, v_3), \ldots (v_{k-2}, v_{k-1})$, and $(v_{k-1}, V_k)$ in which all nodes $v_1, v_2, \ldots v_k$ are distinct, except possibly $v_1 = v_k$. This path is said to be between $v_1$ and $v_k$. A cycle is a path with the first and last nodes the same. A graph is called connected if for every two nodes in the graph, there is a path that connects these two nodes. A graph is called disconnected if it is not connected. A maximal connected subgraph $G_1$ of a graph G is said to be a connected component of graph G. The network of FIG. 2 is a connected graph. An algorithm to define connected components of a graph is set forth in Reingold, et al., *Combinatorial Algorithms, Theory and Practice,* Prentice Hall, Inc. 1977, at p. 330.

Network graph reduction according to the present invention includes eliminating from consideration all bridges and spurs. If $G_1$ is a connected component of a graph G, a link e in $G_1$ is called a bridge if subgraph $G_1$\e is disconnected, i.e., if removing link e from graph $G_1$ makes it disconnected. In FIG. 2, removing links K-Q or N-O makes the graph of the network of FIG. 2 disconnected. Accordingly, links K-Q and N-O are bridges. In Corman, et al., *Introduction to Algorithms,* MIT Press, McGraw-Hill Book Co., 1990, at p. 496, it is disclosed that a link of a graph G is a bridge if and only if it does not lie on any cycle of G. An algorithm is disclosed in Reingold, et al., supra, at pp. 348–353 for generating all cycles of a graph.

Node degree is the number of links that is incident on a node, i.e., that have the node as an end. A spur is any link with at least one node that has a degree equal to one. Thus, in FIG. 2, links A-B, O-P, and T-U are spurs.

Referring now to FIG. 4, the system generates all cycles in graph G at block 23. Then, the system generates all bridges in graph G by removing all cycles from graph G at block 25. Then, at block 27, the system removes all bridges identified in block 25 from graph G and lets G-(bridges) be a resulting graph. Then, at block 29, the system makes a partition of resulting graph G-(bridges) on connected component subgraphs $G_1, G_2, \ldots G_k$, for example by the algorithm disclosed at page 330 of Reingold, et al.

After the system has removed the bridges to form a set of connected subgraphs $G_i, G_2, \ldots G_k$, the system removes from each subgraph $G_i$ any spurs. The system sets I=1 at block 31. Then, the system tests as shown generally at decision block 33, if there is any node X in $G_i$ with a degree equal to 1. The processing of decision block 33 is shown in detail in FIG. 5. If so, the system removes the link incident on the node X, which is the spur, from subgraph $G_i$ and returns to decision block 33 to determine if there are any other spurs in subgraph $G_i$, at block 35. If there is no node X in subgraph $G_i$ with degree equal to 1, then the system sets I=I+1, at block 37, and tests whether or not I>k, at decision block 39. When the system has removed all of the spurs from all of the subgraphs, processing returns to FIG. 3.

Referring now to FIG. 5, there is shown details of the test represented generally by decision block 33 of FIG. 4. First, the system sets a spur flag equal to no, at block 41. Then, at block 43, the system reads a node X from the nodes data. The system tests, at decision block 45 whether or not the end of file has been reached. If so, processing returns to FIG. 4. If the end of file has not been reached, then the system sets index(x)=0, at block 47. Then, the system reads the first or next link e from the links data, at block 49, and tests, at decision block 51 whether or not the end of file has been reached. If not, the system tests, at decision block 53 whether or not link e is incident on node X. If so, the system sets index(x)=index(x)+1, at block 55 and returns to block 49. If, at decision block 53, link e is not incident on node X, then the system returns to block 49 to read the next link from the links data. Thus, the system counts the number of links incident on each node x. When, at decision block 51, all the links have been tested, the system tests, at decision block 57, whether or not index(x), which is the number of links incident on node x, is equal to 1. If so, the system sets spur flag equal to yes at block 59 and returns to FIG. 4 processing. If not, the system returns to block 43 of FIG. 5 to read the next node X from the nodes data.

Figure 6:
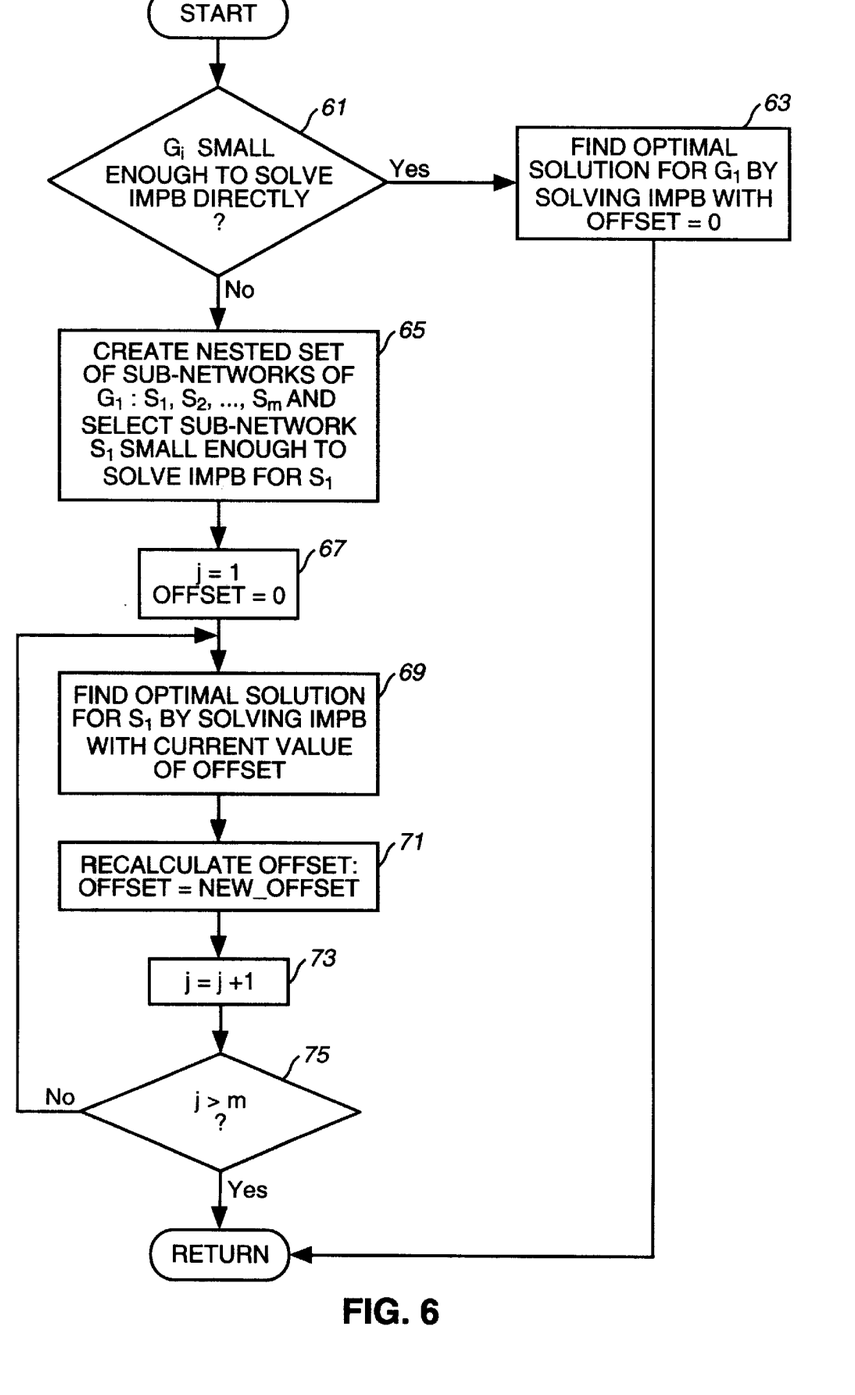
FIG. 6 is a flowchart of the method of finding an optimal solution for a remaining portion or component of a network.

Referring now to FIG. 6, there is shown the processing for finding an optimal solution for each component $G_i$, which is indicated generally at block 17 of FIG. 3. First, the system tests, at decision block 61 whether or not $G_i$ is small enough to solve the integer multicommodity problem for bundling directly. The decision is based upon the number of nodes and links in the subnetwork. The IMPB can be solved directly for networks smaller than about 6 nodes. Thus, in FIG. 2, the IMPB for subnetwork Q-T can be solved directly. If subnetwork Gi is small enough to solve the IMPB directly, then, the system finds an optimal solution for $G_i$ by solving the IMPB with offset equal to zero at block 63. The IMPB is preferably implemented using the AMPL modeling language and a CPLEX solver. The IMPB is formulation in the AMPL language as follows:

```
minimize Total_Cost:
    sum {(i,j) in LINKS} cost[i,j] * Flow_H{i,j};
# Capacity symmetry constraints
subject to Symmetry {(n,k) in LINKS};
    Flow_H{n,k} = Flow_H{k,n};
# Initial solution constraint
subject to InitialSolutionConstraint :
    sum {(i,j) in LINKS} cost[i,j] * Flow_H[i,j]
        <= 2 * sum {(i,j) in COMMODITIES} cost[i,j]-2 *
            offset;
# The following two additional constraints are
version specific:
# In case of one_route version we have the following
2 constraints:
# conservation constraints
subject to Balance {n in NODES, (i,j) in
COMMODITIES}:
    sum {(k,n) in LINKS} use[i,j,k,n] -
    sum {(n,k) in LINKS use[i,j,n,k] =
    net_flow[n,i,j];
# Modularity constraints
subject to Modularity [(n,k) in LINKS}:
    sum {(i,j) in COMMODITIES} demand[i,j] *
    (use[i,j,n,k] + use[i,j,k,n] <= Mod * Flow_H[n,k];
# In case of multi_route version we have the
following 2 constraints:
# Conservation constraints
subject to Balance {n in NODES, (i,j) in
COMMODITIES}:
    sum {(k,n) in LINKS} Flow_L[i,j,k,n] -
    sum {(n,k) in LINKS} Flow_L[i,j,n,k] =
    net_flow[n,i,j];
# Modularity constraints
subject to Modularity {(n,k) in LINKS}:
subject {(i,j) in COMMODITIES} (Flow_L[i,j,n,k] +
Flow_[i,j,k,n]) <= Mod & Flow_H[n,k];
```

If component $G_i$ is not small enough to solve the IMPB directly, then, the system, at block 65, creates a nested set of subnetworks of component of $G_i$ consisting of m subnetworks $S_1, S_2, \ldots S_m$ in such a way that subnetwork $S_1$ small enough to solve the IMPB for $S_1$. In FIG. 2, subnetwork B-F is small enough to solve the IMPB directly.

After the system has created the nested set of subnetworks, the system sets j=1 and offset=0 at block 67. Then, the system finds an optimal solution for $S_j$ by solving the IMPB with the current value of the offset, at block 69. It will be recalled that the offset is part of the initial solution constraint and it is based upon the cost savings obtained with the IMPB for the next smaller nested subnetwork. After the system has found an optimal solution for subnetwork $S_j$, the system recalculates the offset and sets OFFSET=NEW_OFFSET, at block 71. NEW_OFFSET is calculated as follows:

$$NEW\_OFFSET = \sum_{(i,j) \in COMMODITIES} (cost(i, j)) - 1/2 * \sum_{(i,j) \in LINKS} (cost(i, j) * Flow\_H_0(i, j))$$

where $Flow\_H_0(i,j)$ is the IMPB solution for the next smaller nested subnetwork. Then, the system sets j=j+1 at block 73 and tests, at decision block 75, whether or not j>m. If not, processing continues at block 69. If so, processing returns to FIG. 3, and each of the nested subnetworks $S_j$ is optimized.

From the foregoing, it may been seen that the present invention performs a final step in optimizing a network constructed according to application Ser. No. 08/862,290, (Docket No. RIC-96-052 (20350.00015)) filed May 23, 1997, or application Ser. No. 08/863,050, (Attorney Docket No. RIC-96-122 (20350.00020)), filed May 23, 1997. The method of the present invention reroutes remaining demands to eliminate under utilized links.

What is claimed is:

1. A method of optimizing a network, said network comprising a plurality of nodes interconnected by high multiplex level links, at least some of said links carrying a number of low multiplex level remaining demands that is less than the capacity of said links, which comprises the steps of:

partitioning the network into connected components without bridges and spurs; and rerouting remaining demands through each of said connected components of said network to reduce the total number of links in each of said connected components of said network, wherein said rerouting step includes the step of:

minimizing the cost of each said connected components, subject to a symmetry constraint, a conservation constraint, and a modularity constraint.

2. The method as claimed in claim 1, wherein said rerouting step includes the steps of:

dividing said connected components into a plurality of nested sub-networks; and, minimizing the cost of each of said nested sub-networks, subject to a symmetry constraint, a conservation constraint, and a modularity constraint.

3. The method as claimed in claim 2, wherein said step of minimizing the cost of said nested sub-networks includes the steps of:

minimizing the cost of the smallest of said nested sub-networks, subject to a symmetry constraint, a conservation constraint, and a modularity constraint; and, minimizing the cost of the next smallest of said nested sub-networks, subject to a symmetry constraint, a conservation constraint, a modularity constraint, and an initial solution constraint based on the minimized cost of said smallest of said nested sub-networks.

4. The method as claimed in claim 3, wherein said initial solution constraint is based on an offset, said offset being equal to the difference between the initial cost of said smallest nested sub-network and the minimized cost of said smallest nested sub-network.

5. A method of optimizing a network, said network comprising a plurality of nodes interconnected by high multiplex level links, at least some of said links carrying a number of low multiplex level remaining demands that is less than the capacity of said links which comprises the steps of:

partitioning the network into connected components without bridges and spurs, wherein said partitioning step includes the steps of:
    generating all cycles in said network;
    generating all bridges in said network by removing all cycles from said network; and,
    removing all bridges from said network and partitioning remaining network to a set of connected component subnetworks; and
  rerouting remaining demands through each of said connected components of said network to reduce the total number of links in each of said connected components of said network.

6. The method as claimed in claim 5, including the step of:
  removing all spurs from each connected component subnetwork.

7. The method as claimed in claim 6, wherein said removing step includes the step of:
  for each connected component subnetwork, determining whether any node has a degree equal to one.

8. The method as claimed in claim 7, wherein said determining step includes the step of:
  counting the number of links incident on each node of each connected component subnetwork.

9. The method as claimed in claim 7, wherein said determining step includes the steps of:
  a) setting a spur flag equal to no;
  b) reading a node from a list of nodes of said connected component subnetwork;
  c) setting an index for the node read in step b) equal to zero;
  d) reading a link from a list of links of said connected component subnetwork;
  e) incrementing the index for the node read in step b) if the link read in step d) is incident on the node read in step b);
  f) repeating steps d) and e) until all links in said list of links have been read; and,
  g) after step f), setting said spur flag equal to yes if the index for the node read in step b) is equal to one.

* * * * *